United States Patent Office 3,225,618
Patented Dec. 28, 1965

3,225,618
HYDROSTATIC POWER TRANSMISSION SYSTEMS
Graham D. Page, Birmingham, England, assignor to Austin Motor Company Limited, Longbridge, Birmingham, England
Filed July 31, 1962, Ser. No. 213,711
4 Claims. (Cl. 74—472)

This invention relates to variable-ratio hydrostatic power transmission systems for motor vehicles.

According to the invention, in a variable-ratio hydrostatic power transmission system for a motor vehicle, a speed-ratio-selection valve in the hydraulic circuit of the system is controlled by a governor driven by the engine of the vehicle, and the controlling force exercised by this governor in the equilibrium position of the speed-ratio-selection valve is arranged to be opposed by a variable force which consists partly of a component derived from movement of the control linkage of the engine throttle valve (mainly beyond the normal full-throttle position, i.e. in a "kick-down" range of the accelerator pedal), and partly of a component dependent upon the instantaneous overall speed-ratio of the transmission system. The arrangement is, of course, such that, provided the transmission is not in its bottom ratio (corresponding to bottom gear in the case of a mechanical gearbox), or operating at its maximum speed, kick-down of the accelerator pedal results automatically in the selection of a higher speed-ratio (equivalent to a lower gear), or alternatively the ratio is automatically adjusted to give a higher engine speed.

The two components of the variable force referred to may conveniently be designated the accelerator pedal bias and the speed-ratio bias respectively. Whereas with accelerator pedal bias alone the engine speed in the kick-down range would remain constant for a given position of the accelerator pedal, the invention (by providing, in addition, the speed-ratio bias) modifies that characteristic so that, for a given degree of kick-down, the engine speed varies with the speed-ratio; and, therefore, with the output speed, according to a predetermined relationship. In general, matters are so arranged that, for any given degree of kick-down, the modified characteristic of the engine speed/output speed relationship is such that the engine speed rises with output speed. Such a characteristic results in reducing excessive engine speeds at low vehicle speeds, thereby rendering the operation of the engine less obtrusive under those conditions, but still permits the use of full engine speed, and, therefore, maximum engine power, at higher output speeds.

Referring to the accompanying drawings.

Figure 1:
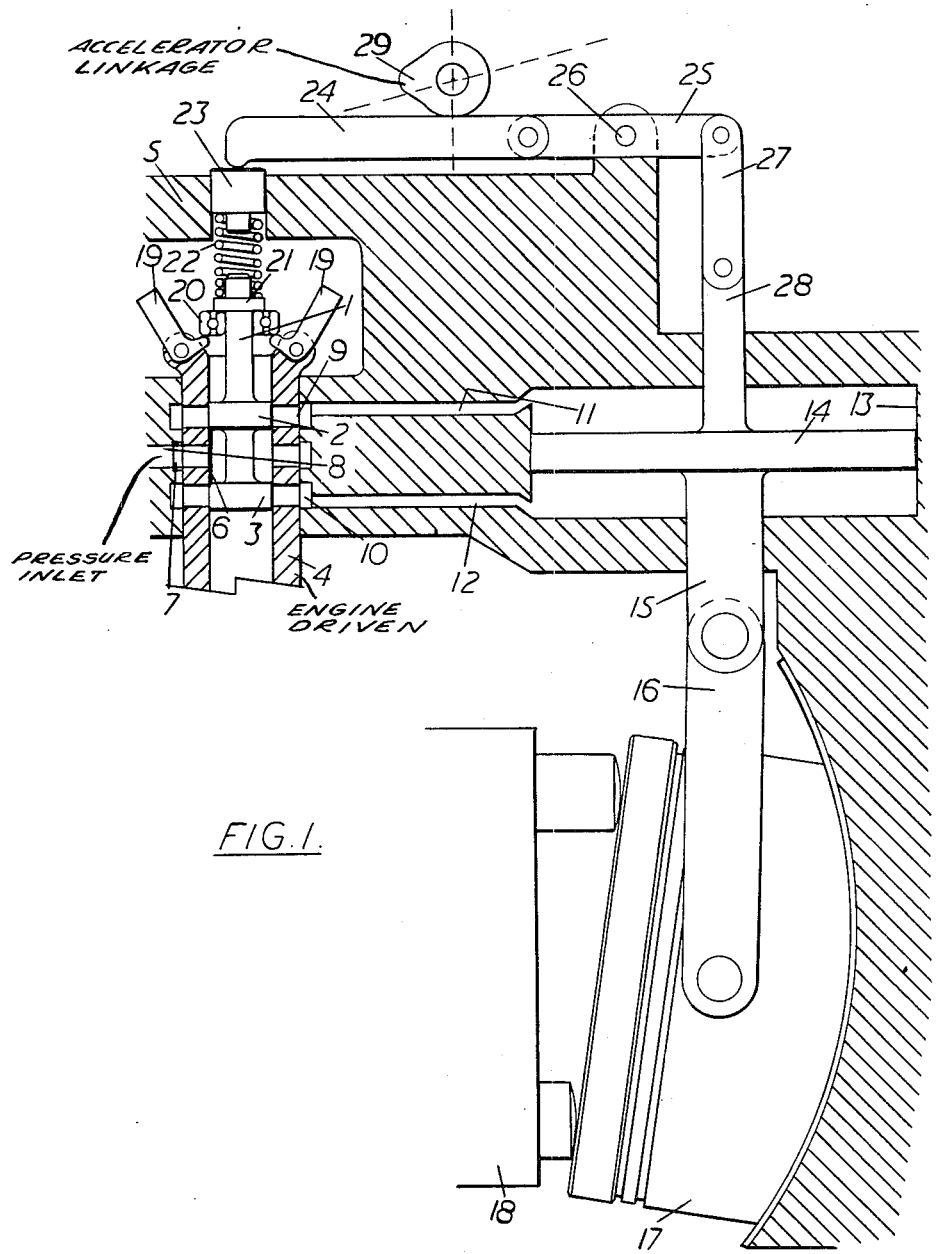
FIGURE 1 is a fragmentary elevation, partly in section, of control mechanism applied in accordance with the invention to a variable-ratio hydrostatic power transmission system.

In the embodiment of the invention depicted in FIGURE 1, the speed-ratio-selection valve mentioned above comprises a piston-valve 1 of the spool type, having two lands 2 and 3, slidable in a ported cylindrical sleeve 4 which is rotatably mounted and slidable axially in a ported stationary block 5. When the valve 1 is in its neutral position (as shown) its annular recess 6 is open to a port 7 connected to a feed 8 of high-pressure fluid, and its lands 2 and 3 each obturate one of a pair of exhaust ports 9 and 10 disposed, in the block 5, at opposite sides of the high-pressure feed port 7. These two exhaust ports are in communication (via ducts 11 and 12 respectively) with opposite ends respectively of a servo-cylinder 13, the piston 14 of which, through a piston rod 15 and a link 16, is arranged to operate means (e.g. the swash-plate carrier 17 of an axial-piston swash-plate hydraulic pump 18 or motor) by which the speed-ratio of the transmission system is changed. With the arrangement shown in FIGURE 1, downward movement of the servo-piston 14 results in the speed-ratio being changed towards "top gear," and upward movement of that piston causes the speed-ratio to be changed towards "bottom gear."

The sleeve 4, which is driven rotationally by the engine of the vehicle, carries a centrifugal governor the bob-weights 19 of which act upon a slidable abutment 20, constituted by a ball-bearing race, which is engageable with a shoulder 21 on the stem of the piston valve 1. The thrust exerted by the governor is opposed by a compression spring 22 interposed between the shoulder 21 and a movable abutment 23 which is linked, by a linkage system which includes what may conveniently be designated a speed-ratio bias link 24, to the servo-piston 14. A link 25, having a fulcrum at 26 on the block 5, is pivotally attached, at one end, to the speed-ratio bias link 24, and, at its other end, to a link 27 which is pivotally connected to a piston rod 28 of the servo-piston 14.

An accelerator pedal bias cam 29, actuated by the control linkage (not shown) of the engine throttle valve, bears against the speed-ratio bias link 24, intermediate the ends of this link, and affords an adjustable fulcrum for it. As a result of this arrangement, for any position of the accelerator pedal within the kick-down range, alteration of the speed-ratio of the transmission system adjusts the engine speed so that this rises with the road speed of the vehicle.

Kick-down of the accelerator pedal beyond the normal full-throttle position causes the cam 29 to depress the link 24, thereby compressing the governor-biasing spring 22 and applying accelerator pedal bias. In consequence, the valve 1 is moved downwardly and high-pressure fluid from the feed port 7 flows through the exhaust port 10 and the duct 12 to the bottom of the servo-cylinder 13, so that the piston 14 is raised somewhat and the speed-ratio of the transmission is changed towards "bottom gear."

When the servo-piston 14 moves towards a higher speed-ratio setting, speed-ratio bias is applied via the link 25 which causes the link 24 to pivot (about the fulcrum constituted by the cam 29) and compress the governor-biasing spring 22, with the result already described in the case of the accelerator pedal bias. The link 24 and the cam 29 can be so designed that the effects which they exercise upon the degree of compression of the governor-biasing spring 22 are virtually additive.

Figure 2:
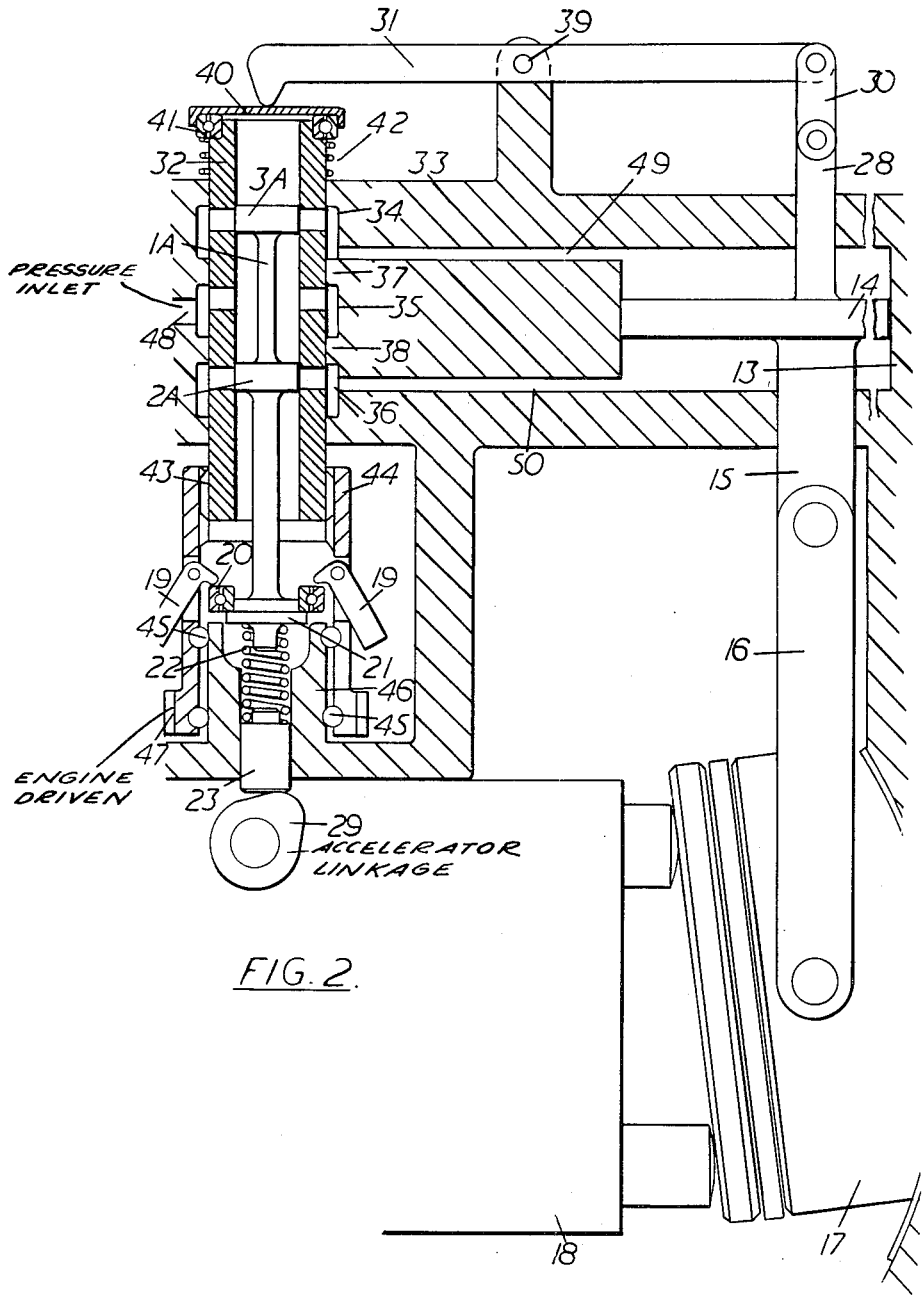
FIGURE 2 is a similar fragmentary view illustrating another embodiment of the invention.

In the embodiment of the invention illustrated in FIGURE 2, the accelerator pedal bias is applied directly, through the cam 29 and the movable abutment 23, to the biasing spring 22 of the engine-driven governor; whilst the speed-ratio bias is applied by a mechanical linkage 30, 31 between the piston rod 28 of the ratio-changing servo-piston 14 and a ported sleeve 32. The latter, which contains a speed-ratio-selection valve 1A of the same type as in the first embodiment (with two lands 2A and 3A, and the shoulder 21), is axially slidable within a stationary ported block 33 the ports 34, 35 and 36 of which are segregated by lands 37 and 38 that locate the ported sleeve 32. It is convenient at this juncture to term that component the governor sleeve 32, and its associated spool-type piston valve the governor piston 1A.

The speed-ratio bias link 31, which has a fulcrum at 39 on the block 33, bears upon a cap 40 housing a ball-bearing 41 the inner race of which is seated on the end of the governor sleeve 32, and the outer race of which rests upon a helical compression spring 42 interposed between it and the block 33. The governor sleeve 32 is splined at 43 to a coaxial hollow shaft 44, which is mounted on ball bearings 45 located on a boss 46 formed on the block 33. The shaft 44 carries the bob-weights 19 of the governor, and has a gear 47 which is driven from the engine of the vehicle.

The port 35 is connected to a feed 48 of high-pressure fluid, and the two exhaust ports 34 and 36 are in communication (via ducts 49 and 50 respectively) with opposite ends of the servo-cylinder 13.

Kick-down of the accelerator pedal beyond the normal full-throttle position causes the cam 29 to rotate and compress the governor-biasing spring 22. As a result, the valve 1A is moved upwardly and high-pressure fluid from the feed port 35 flows through the exhaust port 34 and the duct 49 to the top of the servo-cylinder 13, so that the piston 14 is lowered somewhat and the speed-ratio of the transmission is changed towards "bottom gear."

The mechanical linkage 30, 31 is responsive to a change in the speed-ratio of the transmission system to effect a change in the axial position of the governor sleeve 32, and hence a change in the equilibrium position of the governor piston 1A, resulting in a change in the compression of the biasing spring 22. The arrangement is such that, as the speed-ratio changes towards the "top gear" limit, the governor sleeve 32, and, therefore, the equilibrium position of the governor piston 1A, is moved axially so that when the piston 1A reaches its equilibrium position it produces a further compression of the biasing spring 22 and thus raises the equilibrium speed of the governor. In consequence, for a constant degree of kick-down of the accelerator pedal, the engine speed increases as the speed-ratio of the transmission changes towards "top gear," or alternatively, as the output speed (i.e. vehicle speed) increases.

In both of the embodiments described, the biasing spring 22 prevents rotation of the valve 1 or 1A and, therefore, the relative rotation of the associated sleeve 4 or 32 reduces the friction between it and the valve.

The governor always operates so as to achieve a condition of equilibrium. That is to say, within the available limits of speed-ratio, it controls the engine speed to that determined by the loading of its biasing spring.

If desired, an overriding manual control may be incorporated to apply throttle bias for obtaining engine braking during overrunning.

Figure 3:
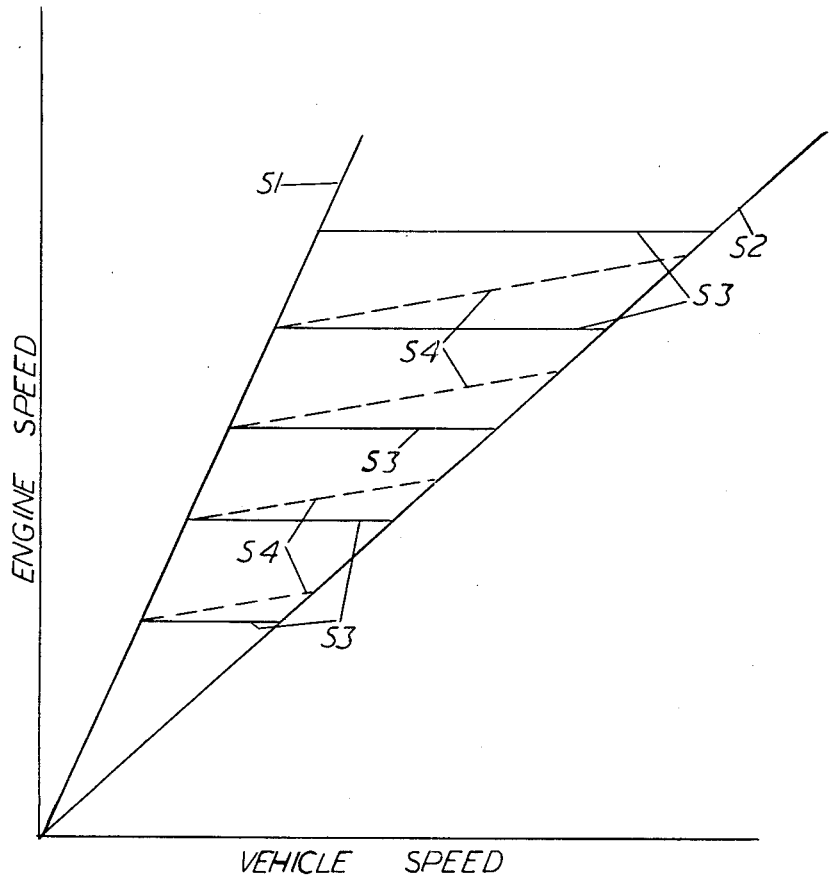
FIGURE 3 is a graphical diagram representing the effect produced by the invention upon the operating characteristics of a variable-ratio hydrostatic power transmission system.

The effect of the invention is shown graphically in FIGURE 3, which exhibits curves representing the relationship of engine speed and vehicle speed. The two lines 51 and 52 represent respectively the lowest and highest speed-ratios afforded by the hydrostatic transmission system. The horizontal lines 53 represent the speed relationships for various degrees of kick-down of the accelerator pedal, without speed-ratio bias. The dotted lines 54 represent the speed relationships for various degrees of kick-down, with speed-ratio bias.

I claim:

1. In combination, a variable ratio hydrostatic power transmission system for a motor vehicle, said motor vehicle having a throttle-controlled engine and said transmission having a hydraulic control circuit, a speed-ratio-selection valve in the hydraulic circuit, a governor for controlling said valve in response to variations in engine speed, and means for opposing the controlling force of the governor in the equilibrium position of the valve comprising a connection between the valve and engine throttle and a connection between the valve and the power transmission, the speed-ratio-selection valve being a spool-type piston-valve which controls a pair of exhaust ports disposed at opposite sides of a port which is connected to a feed of high-pressure fluid; the exhaust ports communicating with opposite ends respectively of a servo-cylinder the piston of which is arranged to operate means by which the speed ratio of the transmission system is changed.

2. A variable ratio hydrostatic power transmission system according to claim 1 in which the thrust exerted upon the piston-valve by the governor is opposed by a governor-biasing compression spring which is interposed between that valve and a movable abutment; and this abutment is linked to the piston of the servo-cylinder by a linkage system which includes a speed-ratio bias link for which an adjustable fulcrum is afforded by a cam actuated by the control linkage of the engine throttle valve in the kickdown range of the accelerator pedal.

3. A variable ratio hydrostatic power transmission system according to claim 1 in which the thrust exerted upon the piston-valve by the governor is opposed by a governor-biasing compression spring which is interposed between that valve and a movable abutment controlled by a cam that is actuated by the control linkage of the engine throttle valve in the kick-down range of the accelerator pedal; the piston-valve is contained in an axially slidable cylindrical sleeve which is ported for co-operation respectively with the feed port and the exhaust ports, and which is splined to a coaxial hollow shaft that carries the governor; and a mechanical linkage between the piston of the servo-cylinder and the slidable sleeve is responsive to a change in the speed ratio of the transmission system to effect a change in the axial position of the sleeve, and hence a change in the equilibrium position of the piston-valve resulting in a change in the compression of the governor-biasing spring at equilibrium.

4. A variable-ratio hydrostatic power transmission system according to claim 1 in which the piston-valve includes a cylindrical sleeve driven rotationally by the engine; and the sleeve is ported for co-operation respectively with the feed port and the exhaust ports, all of which ports are located in a stationary block within which the sleeve is slidable axially.

References Cited by the Examiner

UNITED STATES PATENTS

| 2,178,356 | 10/1939 | Brunner. |
| 2,500,580 | 3/1950 | Segsworth _____ 60—19 |
| 2,902,938 | 9/1959 | Ebert. |
| 2,931,250 | 4/1960 | Ebert. |

FOREIGN PATENTS 142,160   2/1961   Russia.

DAVID J. WILLIAMOWSKY, *Primary Examiner.*

DON A. WAITE, *Examiner.*

T. C. PERRY, *Assistant Examiner.*